Patented June 10, 1952

2,600,238

UNITED STATES PATENT OFFICE 2,600,238

METHOD OF MAKING STEEL

Stanley A. Gilbert, Red Bank, N. J., assignor to American Briquet Company, Philadelphia, Pa., a corporation of Delaware No Drawing. Application July 22, 1949, Serial No. 106,333

9 Claims. (Cl. 75—48)

The present invention relates to a novel method for producing steel, and more particularly to a method for producing steel whereby a carbonaceous material is relied upon to provide at least a portion of the carbon required in the operation.

The manufacture of steel by the basic open hearth process, for example, as it has been practiced for years involves essentially the purification of basic pig iron by the elimination of silicon, manganese, and phosphorus. Carbon is also unavoidably eliminated, but since the pig iron is relatively high in carbon, the elimination of carbon to a predetermined extent is necessary in order to result in the lower carbon content required in the steel. Normally other ferrous materials, such as return scrap steel, heavy melting scrap steel, iron ore, and the like, are included along with the pig iron in the charge to the open hearth furnace. However, the pig iron usually makes up about 45% or more of the metal charge.

In recent years, however, the supply of pig iron was inadequate to meet the demands of the industry. In addition, in steel-manufacturing plants which do not produce their own pig iron, it is normally economically advantageous to employ as little pig iron as possible. Thus, the use of various carbon-supplying substitutes for the pig iron was attempted, the most logical of these being cast iron scrap because of its proximate carbon equivalent to pig iron. The use of this material as the main carbon-supplying ingredient, however, gave rise to many problems. These were due mainly to the cast iron's erratic analysis of carbon and silicon which gave inconsistent results. This was especially detrimental to operations requiring a specific high carbon content at melt. In addition, cast iron being higher in sulfur and phosphorus than basic pig iron, there was often trouble in reducing the content of these elements in the molten steel to the specified maximum.

To eliminate these difficulties and to reduce costs by the reduction or elimination of the cast iron scrap and pig iron, the use of other sources of carbon was attempted. Various cokes such as pitch coke, petroleum coke, and metallurgical coke; anthracite coal, and charcoal were employed with varied and often erratic results. Some of these carbonaceous materials created a gassy or foamy condition in the slag which deflected the heat from the burner, overheating the roof and shortening furnace life.

In other cases slag-coated lumps of the carbonaceous material floated on the slag so that either their carbon-supplying effect was greatly diminished, or overheating of the roof resulted, or both. For instance, the carbon-supplying effect of metallurgical coke is due for the most part to a combination of carburization of the solid metal by an atmosphere of carbon monoxide provided by the coke before substantial melting takes place, of absorption of the carbon by the molten metal, and of forming a reducing atmosphere above the melt by floating on the slag thus protecting the carbon already in the molten metal from the oxidizing influence of the flame. The former phenomenon could not always be relied upon since there was danger of the solid metal becoming decarburized before it melted during the early part of the heat, and the last phenomenon led to overheating of the roof. Some of the carbonaceous materials also burned during charging or during delays in charging so that their carbon-supplying effect was either greatly diminished or lost, and others added sulfur and other undesirable impurities to the charge. It is obvious that all these conditions are detrimental in the commercial production of steel.

It is, therefore, a principal object of the present invention to provide a process for the manufacture of steel wherein a particular carbonaceous material may be relied upon to supply at least a portion of the carbon to the system, in which process the above set forth difficulties are not encountered.

Another principal object of the present invention is to provide a process for the manufacture of steel whereby at least a portion of the normal carbon-supplying material, namely pig-iron, may be eliminated, and in which process the above-mentioned difficulties are not encountered.

Another object is to provide a process for the manufacture of steel in which at least a portion of the pig iron may be eliminated and in which the carbon content of the resulting steel may be readily and consistently controlled.

A further object is to provide a process for the production of steel by the open hearth process wherein a particular carbonaceous carbon-supplying agent is substituted for at least a portion of the normally present pig iron, in which process less carbonaceous carbon-supplying agent is required for a given carbon content in the resulting molten steel than heretofore.

A further object is to provide a process for the manufacture of steel by the open hearth process wherein the time required to completely melt the charge is substantially less than in prior open hearth procedures wherein carbonaceous materials were employed.

Still another object is to provide a process for the manufacture of steel by the basic open hearth method wherein a carbonaceous carbon-supplying material is employed and in which process the carbon-supplying effect of the carbonaceous material is not deleteriously affected by delays and variances in charging times.

Further objects will be apparent from a consideration of the following specification and claims.

In accordance with the process of the present invention there is supplied to the steel-making furnace, and as part of the charge, a predetermined quantity of dense, bead-like carbon granules of the type hereinafter more fully described. The carbon beads or granules replace at least a substantial portion of the pig iron normally charged to the furnace, and except for this factor with its attendant considerations, the process proceeds substantially the same as the well-known steel-making operation for producing steel in that the charge containing, besides the carbon granules, iron-supplying ingredients and other normal additives is subjected to intense heat to provide a bath of molten metal possessing a specified carbon content, the melt further refined if necessary, and finally tapped.

Referring specifically to the carbon granules employed as carbonaceous carbon-supplying agent in accordance with the present invention, they are essentially the product obtained by depositing carbon, by the thermal decomposition of a hydrocarbon, within the interstices of conventional carbon-black pellets. Carbon-black pellets, as is well known, are made by consolidating, either by a wet or a dry method, carbon black particles into discrete, spherical pellets. Actually, the carbon-black particles become gathered in small agglomerates, and these agglomerates are gathered together into pellets ranging in size between about 6 mesh and about 60 mesh, although larger sizes have been made as high as about 1 inch in diameter. These pellets are porous and friable in character and have an apparent density, that is, density in bulk, of from about 12 to about 28 pounds per cubic foot, and while they are sufficiently cohesive to permit shipment in bulk they are easily crushed, and may be crushed between the fingers. These pellets are, however, useless for the purpose of the present invention.

The carbon beads or granules employed in accordance with the process of the present invention are prepared by subjecting the above-described conventional carbon black pellets, in a glowing or incandescent condition and at a temperature between about 1400 and about 3500° F., to a stream of hydrocarbon, in the gaseous state (such as methane, natural gas, propane, vaporized mineral oil, and the like). The hydrocarbon, upon coming into contact with incandescent carbon-black pellets, decomposes depositing carbon within the interstices of the original pellet. During the treatment there is little or no detectable change in the size or shape of the original pellets, however, their density continually increases, the degree of increase depending upon the length of time during which the pellets are subjected to the treatment and the temperature of treatment. That is to say, the higher the temperature of treatment and the greater the length of time of treatment the greater will be the increase in density. Thus, apparently the carbon deposition takes place principally within the interior structure of the pellets with but a very thin film on the exterior surface. By this method, deposition of the carbon can be continued until the pellets are substantially saturated with the deposited carbon in which case a very hard and dense structure is obtained possessing an apparent density as high as 65 lbs. per cubic foot. Ordinarily, however, deposition is discontinued at a point short of saturation, and the treatment may be of relatively short duration to provide an apparent density of as low as 30 lbs. per cubic foot. Thus, the carbon granules employed in accordance with the present process will possess densities within this range, and preferably the carbon granules will possess an apparent density of at least 35 lbs. per cubic foot.

The pellets thus prepared are hard, non-friable, substantially spherical bead-like carbon bodies possessing higher apparent densities than the original pellets, the exact increase in density depending, as stated, upon the length of time and temperature of treatment. They cannot be crushed between the fingers, and, as the density increases the resistance to crushing increases until in the upper range of densities the granules cannot be crushed even by stepping on them. In addition, as the result of the treatment, other changes take place within the original pellet. For instance, as the density increases, the purity with respect to carbon also increases, and the dull black appearance of the original carbon black pellet gradually changes through a grayish to a light gray appearance and thence to a silvery luster. Furthermore, and of prime importance from the standpoint of the present invention, the original carbon black pellets, which would be useless in the manufacture of steel, are converted by the treatment, into material particularly suitable for use in the manufacture of steel, in that the granules possess marked resistance to burning or other deterioration in the furnace before the metal has melted.

While the exact reasons for these phenomena are not fully understood, it is believed that the carbon deposited within and upon the original carbon black pellets is a form of crystalline graphitic carbon. Specifically, it is believed that this crystalline carbon is a dense form of microcrystalline graphite referred to as glance carbon by Iley and Riley in "Deposition of Carbon on Vitreous Silica" in the Journal of the Chemical Society for September 1948, on pages 1362 to 1366. Glance carbon exists in the form of hexagonal lamellae in films only a few atoms in thickness, and imparts a luster to the surface upon which it is deposited. Apparently, during the cracking of the hydrocarbon, the individual carbon black particles making up the agglomerates in the pellets, and possibly the agglomerates themselves, serve as nuclei upon which the deposition of glance carbon is favored. The glance carbon thus becomes deposited on the individual particles, and possibly to some extent on the individual agglomerates within the pellet, forming a continuous bond or matrix within the original pellet. This dense matrix of crystalline graphite accounts for the marked increase in hardness and resistance to crushing even after an increase in apparent density of only a few pounds. The thin film of glance carbon deposited on the surfaces of the external particles or agglomerates of the pellet account for the change in appearance. This coating and impregnation with glance carbon, along with the increased hardness, strength and density, is believed to account for the resistance of the pellets against burning or other deterioration in the furnace. However, when the metal has melted, the glance carbon, which is readily soluble in the molten metal quickly dissolves therein. The dissolution of the glance carbon releases the very fine carbon black particles, which, because of their size and surface area, are also quickly dissolved by the molten metal. In addition, the temperature and hydrogen-rich atmosphere to which the carbon black pellets are subjected during the treatment also plays an important part in reducing the volatile content of the original pellet and eliminating any last traces of deleterious impurities such as sulfur.

Referring again to the process of the present invention, since the present invention is particularly applicable to the manufacture of steel by the well-known basic open hearth operation, the process will be described herein with particular reference to that operation. Thus, in accordance with the preferred embodiment of the invention, the above-described carbon granules are included in the charge to the basic open hearth furnace, and in the basic open hearth procedure for making steel. The basic open hearth method of making steel is too well known to require detailed discussion here. Generally speaking, in the ordinary open hearth operation the charge comprises pig iron (solid or molten) and other iron-supplying ingredients such as cast iron, return scrap steel (e. g. defective or broken steel ingots, turnings, cuttings, etc.), scrap steel, iron ore, and the like, the pig iron, and any cast iron, serving also as the main carbon-supplying ingredients; and limestone or a mixture of limestone and lime, to provide the lime-boil and basic slag-forming materials. When the term "lime" is used herein it will be understood to mean limestone (including dolomite), or a mixture of limestone and calcined or burned lime. The relative amounts of ingredients, while subject to wide variation depending upon their nature and the type and quantities of impurities therein, are generally proportioned to eliminate as much of the silicon, manganese and phosphorus as possible from the metal by oxidization thereof to oxides followed by formation of calcium salts of the oxides and retention of these salts in the slag; to provide the desired amount of metal, and to provide a predetermined carbon content in the metal at the time it has melted.

In accordance with the present invention, as stated, at least a portion of the normal main carbon-supplying agent, the pig iron, is eliminated and the described carbon granules are substituted therefor, the loss of iron due to elimination of that portion of pig iron being made up, of course, by inexpensive, low-carbon materials such as scrap steel. The amount of pig iron replaced by the carbon granules may vary widely and all the pig iron may be eliminated if desired. As a general rule the carbon granules will be employed in an amount at least substantially equal to the carbon equivalent of the pig iron eliminated.

A convenient method for determining the amount of carbon granules to be employed in any particular case, is in terms of the "carbon equivalent" of the charge required for any given carbon content desired in the molten metal. "Carbon equivalent," as is well-known in the art, refers to a percent by weight, based on the weight of the metal charge, of the carbon present plus the percent by weight of that carbon which is stoichiometrically equivalent, in terms of deoxidizing power, to the oxidizable non-ferrous metals present, i. e. silicon, manganese and phosphorus. For this purpose the carbon is assumed to be oxidized to carbon monoxide, the silicon to silicon dioxide, the manganese to manganese oxide (MnO), and the phosphorus to phosphorus pentoxide. Taking 100 pounds of a certain pig iron for example, which contains 4.15% carbon, .85% of silicon, 1% of manganese and 0.2% phosphorus, the carbon equivalent of the pig iron is the sum of 4.15 plus 24/28 times 0.85%, plus 12/55 times 1%, plus 30/31 times 0.2%, or a carbon equivalent of about 5.3%. The same principles apply in determining the carbon equivalent of the charge.

Normally, the carbon equivalent of the charge to the open hearth furnace, may range from as low as about 1.2% to about 4% based on the weight of the metal charge, the exact carbon equivalent chosen depending primarily upon whether the product steel is to have a low carbon content, for instance as low as .02%, a high carbon content, for instance as high as 1.30%, or an intermediate carbon content. The pig iron, and cast iron if present, provided the bulk of this carbon equivalent in prior open hearth operations. In accordance with the present invention wherein at least a portion of the pig iron is replaced by the described carbon granules, the granules will usually provide at least two-tenths of the carbon equivalent of the charge, although certain of the advantages of the present invention can be realized when the carbon granules make up as little as about one-twelfth of the carbon equivalent of the charge. Preferably, the carbon granules make up at between about one-fourth to about one-half of the carbon equivalent of the charge. Since all the pig iron may be eliminated if desired, the carbon granules being relied upon to furnish the bulk of the required carbon equivalent, the carbon granules may furnish as high as three-fourths of the carbon equivalent of the charge to the furnace.

In charging the carbon granules to the furnace a wide variety of techniques is available, the selection of which will depend upon various factors including the nature and type of iron-supplying ingredients available, for example, whether the scrap is bulky or fine, whether pig iron is to be employed and if so whether it is to be added to the furnace in a solid or molten condition, whether iron ore is to be employed, and the like. Normally the carbon granules will be positioned near the bottom of the charge either in admixture with an initial charge of scrap steel or sandwiched between an initial layer of scrap steel and a further layer of scrap steel. Preferably, the carbon granules are sandwiched between layers of light section, flat steel scrap. In any event, the major portion of the iron-supplying ingredients will be charged above the carbon granules in the furnace, the burned lime and limestone preferably being positioned above the carbon granules and below the balance of the iron-supplying material to provide a good lime boil. Where pig iron or cast iron is to be added it is generally added after all the scrap has been charged to the furnace. Other ingredients which are normally added to the furnace for particular purposes may be added in the present process at the appropriate time. For example, if nickel- copper- or chromium-containing steels are to be made, the nickel, copper and/or chromium may be added to the furnace with the charge in the form of scraps, nickel- copper- and/or chromium-containing steels, solid copper, nickel and/or chromium, or in the form of various alloys such as ferro-chromium, in accordance with well-known practice. In addition, it is not necessary that the carbon granules be the sole carbonaceous material employed. For instance, as will be pointed out hereinafter in connection with Example V, advantages of the present invention may be realized when the carbon granules are used in conjunction with other carbonaceous materials such as metallurgical coke. However, when such other carbonaceous materials are employed, the carbon granules will make up not less than about 50% of the combined carbonaceous materials.

During charging, the furnace will be at or near operating temperatures, for instance between about 2600° F. and about 3200° F., in accordance with normal practice so that the bottom of the furnace will be hot to prevent the freezing of the molten metal as it trickles down through the charge. Heating and melting of the metal, therefore, take place during charging and in the cases where bulky pieces of scrap are employed it is often necessary that these be melted down to make room for additional charge. There are often delays in charging due to breakdown of charging equipment or diversion of the use of this charging equipment to another furnace. These delays cause the portion of the metal and other ingredients (including the carbonaceous material) to be exposed for an abnormal length of time to the oxidizing atmosphere of the furnace. As will be pointed out hereinafter, the carbon granules employed in accordance with the present invention are not deleteriously affected during these delays as were other carbonaceous materials. After the addition of the carbon granules to the furnace, the remaining steps coincide with the well-known basic open hearth operation.

During and after melting, chemical reactions, which are well-known to those familiar with the manufacture of steel, take place in the furnace. For instance, the silicon and phosphorus become oxidized to acidic oxides. These oxides are in turn neutralized, and ultimately end up in the slag mainly as calcium salts. Manganese is also oxidized, the manganese oxide being retained, as such, in the slag. Some of the sulfur is converted to sulfides, sulfites and sulfates which are held in the slag. Part of the carbon, both that supplied by the carbon-containing metal charge ingredients and by the carbon granules, also becomes oxidized. The carbon granules apparently first dissolve in the molten metal, and then a portion thereof, along with the carbon already present in the metal ingredients is oxidized, partly through reaction with iron oxide reducing the oxide to metallic iron; partly through reaction with the carbon dioxide liberated by the calcination of the limestone and partly due to the oxidizing atmosphere of the furnace. A portion of the carbon, of course, remains behind dissolved in the molten metal to provide the required carbon content.

After the metal is completely melted it may be further refined, if necessary, in accordance with well-known procedures. For instance, further carbon, silicon, sulfur or phosphorus may be removed, if necessary, by the addition of $Fe_2O_3$ such as feed ore, or $Fe_3O_4$ such as mill scale. Normally the carbon content of the molten metal is purposely set higher than that required in the product steel. Thus, during subsequent refinement with the further removal of silicon, sulfur and manganese and also carbon, the carbon content decreases to that desired in the product steel. Also, after the metal has melted, entrapped gases and solid impurities in the molten metal may be removed by agitation. Alloys may be added, or the slag conditioned to retain sulfur and phosphorus and to thin it out, by the addition of more lime and fluxes such as fluorspar. After any refinement, the furnace is tapped, the molten steel being run off into ladles from which it is poured into ingot molds.

The use of the carbon granules of the type described provides many important advantages over the use of other carbonaceous carbon-supplying materials. In the first place, the carbon granules are much more efficient in their carbon-supplying capacity than other carbonaceous materials. For instance, a relatively small quantity of the carbon granules will provide the same carbon supplying effect as a quantity of metallurgical coke as much as two to three times greater. In addition, with the use of carbon granules no danger of a foaming slag is encountered as has been the case with metallurgical coke for example. These two factors combine to permit the use of the carbon granules in operations for producing high carbon steel with the elimination of a high proportion of pig iron, where owing to the large amount of metallurgical coke which would be required with its attendant deleterious foaming effect on the slag, it is virtually impossible to employ metallurgical coke. Moreover, the carbon-supplying effect of the carbon granules is much more consistent from heat to heat than that of other carbonaceous materials. While the exact reason for this is not fully understood, it is believed that the film of glance carbon surrounding and impregnating each granule prevents the carbon black therein from burning out before the metal has melted. The increased strength and hardness, imparted by the deposited glance carbon, aids in this resistance to deterioration. However, when the metal is melted the glance carbon, being readily soluble therein, quickly dissolves releasing the fine carbon black particles, which, because of their size also quickly dissolve in the melt. Thus, since the carbon-supplying effect of the granules is due mainly to dissolution in the molten metal instead of to solid carburization or to a blanketing effect as is the case with other carbonaceous materials, and since the pellets exhibit remarkable stability at the high temperature and other extreme conditions encountered during charging, the granules for the most part are not adversely affected nor their carbon-supplying power lost before being dissolved by the molten metal. Thus delays in charging, temporary breakdown in fuel supply, or varying melt down times, have little or no effect on the carbon-supplying power of the carbon granules.

The use of the carbon granules of the type described in accordance with the present invention also provides advantages over the prior open hearth operation wherein pig iron was the main carbon-supplying ingredient in addition to the obvious economic advantage of substituting the carbon granules and scrap steel for pig iron. For instance, in the open hearth furnace, the extent to which carbon is lost by the pig iron increases as the length of time of heating increases. Thus, because of this property of pig iron, results were often inconsistent from heat to heat when varying melt down times were encountered due to delays in charging or other factors. As pointed out above, the carbon-supplying capacity of the carbon granules is not affected significantly by such conditions.

While the foregoing discussion has dealt primarily with the basic open hearth procedure for the manufacture of steel, to which the present invention is particularly applicable, it will be appreciated that certain of the advantages of the present invention will also be realized in any procedure for the manufacture of steel wherein a charge comprising iron-supplying ingredients and carbon is subjected to heat in a furnace to provide molten metal having a predetermined carbon content, including the acid open hearth process, the electric furnace process, and the like. In the acid open hearth process, for example, where removal of sulfur is extremely difficult, the use of the sulfur-free carbon granules in accordance with the present invention is particularly advantageous as compared to the use of other carbonaceous materials, such as metallurgical coke, or even pig iron, each of which contains appreciable amounts of sulfur.

The following examples are to illustrate, but not to limit the scope of the process of the present invention. In the examples, the carbon content of the metal after complete melting is higher, in most cases 40 points higher, i. e. .40%, based on the weight of the charge, than that desired in the product steel, in order to allow for further carbon removal during subsequent refining. The carbon granules employed possessed an apparent density of 35–40 lbs. per cubic foot.

Example I

The furnace used was a standard basic open hearth furnace having a capacity of about 180,000 pounds of metal. The heat is supplied to the furnace by oil burners placed at each end of the furnace and fired alternately, developing a flame temperature up to 3500° F.

With the bottom of the furnace freshly prepared with dolomite and the burners on, a charge of 1760 pounds of carbon granules sandwiched between a layer of heavy melting scrap steel and a layer of return scrap steel was made to the furnace. After about 20 minutes, 2500 pounds of limestone and 4800 pounds of burned lime were added, followed by more return scrap steel and heavy melting scrap steel until 44,300 pounds of return scrap steel, and 75,180 pounds of heavy melting scrap steel had been charged. When this material had melted down sufficiently to make room, 2400 pounds of pig iron and 39,180 pounds of cast iron scrap were added. The carbon equivalent of the metal ingredients was 2.21%, and the carbon granules provided an additional 0.92%, making a total carbon equivalent for the charge of 3.13%. The charging time was 4.67 hours. After a total time of 8.16 hours the metal was completely melted and ready for refinement and tapping. The molten steel possessed a carbon content of 1.44%.

Example II

In this example substantially the same procedure was followed as in Example I except that 1015 pounds of carbon granules, 7700 pounds of limestone, 3860 pounds of burned lime, 71,000 pounds of pig iron, 36,930 pounds of return scrap steel, 74,590 pounds of heavy melting scrap steel, and no cast iron were charged to the furnace. The carbon equivalent of the metal ingredients was 2.46%, and the carbon granules provided an additional .55%, giving a carbon equivalent for the charge of 3.01%. The charging time was 4.16 hours. After a total time of 7.42 hours the metal was completely melted and the molten steel had a carbon content of 1.39%.

Example III

In this example substantially the same procedure was followed as in Example I except that 2530 pounds of carbon granules, 7700 pounds of limestone, 3860 pounds of burned lime, 35,080 pounds of pig iron, 49,540 pounds of return scrap steel, 98,940 pounds of heavy melting scrap steel, and no cast iron were charged to the furnace. The carbon equivalent of the metal ingredients was about 1.55%, and the carbon granules provided another 1.36%, giving a carbon equivalent for the metal charge of 2.91%. The charging time was 4.91 hours. After a total time of 8.50 hours the metal was completely melted and the molten steel had a carbon content of 1.12%. In this example, if the carbon granules had been eliminated and pig iron relied upon to provide the same carbon content in the molten metal, 85,000 pounds of pig iron would have been required.

Example IV

The procedure of Example III was followed substantially except 2,530 pounds of carbon granules, 7700 pounds of limestone, 3860 pounds of burned lime, 35,000 pounds of pig iron, 50,020 pounds of return scrap steel, 97,840 pounds of heavy melting scrap steel and no cast iron scrap were charged to the furnace. The carbon equivalent of the metal ingredients was about 1.55%, and the carbon granules provided an additional 1.37%, giving a carbon equivalent for the charge of 2.92%. The charging time was 4 hours. However, during the melting the oil burners went off for an hour. After the oil burners were again ignited, a total time of 9.83 hours had elapsed before the metal was completely melted, at which time the molten steel had a carbon content of 1.12%. It will be noted that the hour of delay during melting did not alter the efficiency of the carbon granules. It has been found, when pig iron or other carbonaceous materials such as metallurgical coke have been relied upon to supply carbon, that variations in melting times cause variations in carbon content at melt. Thus, where delays such as this have been encountered in an operation where pig iron and/or metallurgical coke was relied upon as the carbon-supplying material, extra pig iron had to be added to provide the desired carbon content in the melt.

Example V

The procedure of Example I was followed substantially except that 500 pounds of carbon granules, 500 pounds of metallurgical coke, 7700 pounds of limestone, 3860 pounds of burned lime, 23,900 pounds of pig iron, 60,600 pounds of cast iron scrap, 38,200 pounds of return scrap, and 58,940 pounds of heavy melting scrap were charged to the furnace. The carbon equivalent of the metal ingredients was 2.73, and the carbon granules and metallurgical coke each provide an additional .27%, to give a carbon equivalent for the charge of about 3.27%. The charging time was 5.00 hours. After a total time of 8.45 hours, the metal was completely melted and the molten steel possessed a carbon content of 1.31%.

Five heats were run using like amounts of limestone, lime, pig iron, cast iron scrap, return scrap, and heavy melting scrap, but using 1000 pounds of metallurgical coke (providing a carbon equivalent of .54%, and a total carbon equivalent for the charge similar to the above) instead of the mixture of this example. The average charging time was 4.64 hours, and the average melting time was 9.29 hours. The average carbon contents of the molten metal for these five heats was only 0.93%.

Considerable modification is possible in the selection of the particular metal-supplying and other normal steel-making ingredients, and in the particular proportions thereof, as well as in the various techniques employed in charging and operating the furnace without departing from the scope of the present invention.

I claim:

1. In the manufacture of steel wherein a charge comprising iron-supplying ingredients and carbon is subjected to heat in a furnace to provide molten metal containing a predetermined carbon content, the improvement which comprises adding to the furnace as part of the charge and as a carbon-supplying charge ingredient hard, carbon granules comprising agglomerated carbon black particles bound in a matrix of thermally deposited carbon, said granules having a particle size between about 6 and about 60 mesh, and having an apparent density between about 30 and about 65 pounds per cubic foot.

2. The process of claim 1 wherein said carbon granules comprise between about one-twelfth and about three-quarters of the carbon equivalent of the charge.

3. The process of claim 2 wherein the charge has a carbon equivalent of between about 1.2% and about 4%.

4. In the manufacture of steel wherein a charge comprising iron-supplying ingredients and carbon is subjected to heat in a furnace to provide molten metal containing a predetermined carbon content, the improvement which comprises adding to the furnace as part of the charge and as a carbon-supplying charge ingredient hard, carbon granules comprising agglomerated carbon black bound in a matrix of thermally deposited carbon, said granules having a particle size between about 6 and about 60 mesh, and having an apparent density between about 35 and about 65 pounds per cubic foot.

5. The process of claim 4, wherein said carbon granules comprise between about one-twelfth and about three-quarters of the carbon equivalent of the charge.

6. The process of claim 5 wherein the charge has a carbon equivalent of between about 1.2% and 4%.

7. In the manufacture of steel by the basic open hearth process wherein a charge comprising iron-supplying materials, carbon, and lime is subjected to heat in a furnace to provide molten metal containing a predetermined carbon content, the improvement which comprises adding to the furnace as part of the charge and as a carbon-supplying charge ingredient hard, carbon granules comprising agglomerated carbon black bound in a matrix of thermally deposited carbon, said granules having a particle size between about 6 and about 60 mesh, and having an apparent density between about 30 and about 65 pounds per cubic foot.

8. The process of claim 7 wherein said carbon granules comprise between about one-twelfth and about three-quarters of the carbon equivalent of the charge.

9. The process of claim 8 wherein the charge has a carbon equivalent of between about 1.2% and about 4%.

STANLEY A. GILBERT.

REFERENCES CITED

The following references are of record in the file of this patent:

UNITED STATES PATENTS

| Number | Name | Date |
|---|---|---|
| 943,171 | Atha | Dec. 14, 1909 |
| 1,259,121 | Mott | Mar. 12, 1918 |
| 1,973,707 | Goucher | Sept. 18, 1934 |
| 2,167,674 | Offutt | Aug. 1, 1939 |
| 2,392,682 | Marek | Jan. 8, 1946 |

FOREIGN PATENTS

| Number | Country | Date |
|---|---|---|
| 20,393 | Great Britain | of 1890 |
| 121,785 | Great Britain | Dec. 30, 1918 |
| 550,379 | Great Britain | Jan. 5, 1943 |
| 53,795 | Germany | Sept. 13, 1890 |

OTHER REFERENCES

Transactions of the American Electrochemical Society, vol. XLI, 1922, pages 71 and 81. Published by the American Electrochemical Society, New York, N. Y.